United States Patent
Starkey et al.

(10) Patent No.: US 11,732,677 B2
(45) Date of Patent: Aug. 22, 2023

(54) RING-SHAPED BOOSTER ROCKET

(71) Applicant: Raytheon Company, Waltham, MA (US)

(72) Inventors: Ryan Starkey, Tucson, AZ (US); Dario N. Altamirano, Tuscon, AZ (US); John Meschberger, Sahuarita, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/181,162

(22) Filed: Feb. 22, 2021

(65) Prior Publication Data
US 2022/0268240 A1    Aug. 25, 2022

(51) Int. Cl.
| | |
|---|---|
| *F02K 9/97* | (2006.01) |
| *F02K 9/76* | (2006.01) |
| *F02K 9/32* | (2006.01) |
| *F02K 9/08* | (2006.01) |
| *F02K 9/34* | (2006.01) |
| *B64G 1/40* | (2006.01) |
| *F02K 9/88* | (2006.01) |

(52) U.S. Cl.
CPC ............... *F02K 9/97* (2013.01); *B64G 1/403* (2013.01); *F02K 9/08* (2013.01); *F02K 9/32* (2013.01); *F02K 9/34* (2013.01); *F02K 9/763* (2013.01); *F02K 9/88* (2013.01)

(58) Field of Classification Search
CPC ... B64G 1/403; F02K 9/08; F02K 9/34; F02K 9/78; F02K 9/88; F02K 9/97; F02K 9/763
See application file for complete search history.

(56) References Cited

U.S. PATENT DOCUMENTS

| | | | |
|---|---|---|---|
| 3,093,964 A * | 6/1963 | Hausmann | F02K 9/763 60/39.47 |
| 3,094,072 A * | 6/1963 | Parilla | F02K 9/92 60/768 |
| 3,118,377 A | 1/1964 | Davies | |
| 3,167,016 A * | 1/1965 | Czerwinski | F41F 3/04 244/3.23 |

(Continued)

OTHER PUBLICATIONS

Salmi, Bryce, "The World's Largest 3D Metal Printer Is Churning Out Rockets," Oct. 25, 2019, IEEE, https://spectrum.ieee.org/the-worlds-largest-3d-metal-printer-is-churning-out-rockets.

(Continued)

*Primary Examiner* — Todd E Manahan
*Assistant Examiner* — Kyle Robert Thomas
(74) *Attorney, Agent, or Firm* — Renner, Otto, Boisselle & Sklar

(57) ABSTRACT

A rocket booster has an annular shape, with a casing defining an annular space therewithin, and a solid rocket fuel in the annular spacing. The rocket booster also includes one or more nozzle pieces, mechanically coupled to the casing, that define one or more nozzles at the aft side of the rocket booster. The rocket booster may be mechanically coupled to an object protruding from the back of a fuselage of a flight vehicle, such as a missile. For example, the rocket booster may be placed around an aft turbojet nozzle of the flight vehicle. This allows the rocket booster to be used in situations where primary propulsion must be running both before and after (and perhaps during) the firing of the rocket booster.

20 Claims, 5 Drawing Sheets

(56) References Cited

U.S. PATENT DOCUMENTS

| | | | | |
|---|---|---|---|---|
| 3,305,194 | A * | 2/1967 | Conard | F42B 10/64 |
| | | | | 244/3.21 |
| 3,434,291 | A * | 3/1969 | Friedman, Jr. | F02K 9/92 |
| | | | | 60/229 |
| 3,806,064 | A * | 4/1974 | Parilla | F02K 9/80 |
| | | | | 244/171.1 |
| 4,745,861 | A * | 5/1988 | Fenton | F02K 9/30 |
| | | | | 102/377 |
| 4,964,339 | A | 10/1990 | Bastian et al. | |
| 5,067,316 | A * | 11/1991 | Bonniot | F02K 9/82 |
| | | | | 239/265.23 |
| 6,968,695 | B2 | 11/2005 | Schmotolocha et al. | |
| 10,400,711 | B2 * | 9/2019 | Lee | F02K 9/95 |
| 2005/0211827 | A1 | 9/2005 | Barocela | |
| 2015/0204274 | A1 * | 7/2015 | Fowler | B29C 70/48 |
| | | | | 239/265.11 |

OTHER PUBLICATIONS

The pending claims of corresponding U.S. Appl. No. 17/181,158.
Office Action dated Oct. 5, 2021 in corresponding U.S. Appl. No. 17/181,158.
International Search Report and Written Opinion dated Feb. 11, 2022 in corresponding International Application No. PCT/US2021/038387.
International Search Report and Written Opinion dated Feb. 10, 2022 in related Application No. PCT/US2021/038389.

* cited by examiner

RING-SHAPED BOOSTER ROCKET

GOVERNMENT LICENSE RIGHTS

This invention was made with government support under Contract No. W15QKN-17-9-0016, awarded by the United States Army. The government has certain rights in the invention.

FIELD OF THE INVENTION

The invention is in the field of booster rockets for flight vehicles, such as missiles.

DESCRIPTION OF THE RELATED ART

Booster rockets are sometimes used to add thrust to flight vehicles, such as missiles. Certain limitations are sometimes present regarding the characteristics for add-on booster rockets.

SUMMARY OF THE INVENTION

A booster rocket has an annular shape, allowing it to be placed around an object, with one or more nozzle insert defining one or more nozzles of the rocket.

A booster rocket is mechanically coupled to a nozzle of a main propulsion system, such as a jet, without interfering with operation of the jet.

A booster rocket is couplable to a part of existing flight vehicle, adding thrust without expanding the envelope of the flight vehicle.

A booster rocket is mechanically coupled to a part of main propulsion system, and remains so coupled even after the propellant (fuel) of the booster rocket is expended.

According to an aspect of the invention, a booster rocket includes: an annular casing defining an annular space therewithin, and having a central opening; a solid rocket fuel in the annular space; and one or more nozzle pieces mechanically coupled to the annular casing, defining one or more nozzles at an aft end of the annular casing.

According to an embodiment of any paragraph(s) of this summary, the one or more nozzle pieces includes an annular nozzle piece that defines an annular nozzle.

According to an embodiment of any paragraph(s) of this summary, the annular nozzle piece is bolted to the annular casing.

According to an embodiment of any paragraph(s) of this summary, the booster rocket further includes a seal between the annular nozzle piece and the annular casing.

According to an embodiment of any paragraph(s) of this summary, the seal is a silicone seal.

According to an embodiment of any paragraph(s) of this summary, the annular nozzle piece defines the annular nozzle in combination with an inner nozzle insert that is attached to the annular casing.

According to an embodiment of any paragraph(s) of this summary, the inner nozzle insert is bonded and attached by shear bolts to the annular casing.

According to an embodiment of any paragraph(s) of this summary, the annular nozzle piece and the inner nozzle insert together constitute a throat insert set.

According to an embodiment of any paragraph(s) of this summary, the annular nozzle piece has protrusions protruding inward from an inner edge, the protrusions facilitating maintaining an annular gap of the annular nozzle.

According to an embodiment of any paragraph(s) of this summary, the annular nozzle piece is made of a metallic material.

According to an embodiment of any paragraph(s) of this summary, the annular nozzle piece is made of a non-metallic material.

According to an embodiment of any paragraph(s) of this summary, the annular nozzle piece is made of aluminum.

According to an embodiment of any paragraph(s) of this summary, the annular nozzle piece and the annular casing are made of the same material.

According to an embodiment of any paragraph(s) of this summary, the annular nozzle piece is made of a phenolic material.

According to an embodiment of any paragraph(s) of this summary, the one or more nozzle pieces includes multiple nozzle pieces.

According to an embodiment of any paragraph(s) of this summary, the multiple nozzle pieces are circumferentially spaced around aft end of the annular casing.

According to an embodiment of any paragraph(s) of this summary, the multiple nozzle pieces are located in circular openings in the aft end of the annular casing.

According to an embodiment of any paragraph(s) of this summary, the booster rocket further includes an igniter coupled to an outer surface of the annular casing, with the igniter operatively coupled to the solid rocket fuel, to facilitate initiation of combustion of the solid rocket fuel.

According to an embodiment of any paragraph(s) of this summary, the booster rocket further includes an ignition booster on an inner wall of the annular casing, with the ignition booster operatively coupled to the igniter and the solid rocket fuel, to facilitate initiation of combustion of the solid rocket fuel.

According to an embodiment of any paragraph(s) of this summary, the casing is made of metal.

According to an embodiment of any paragraph(s) of this summary, the casing is made of sheet metal.

According to an embodiment of any paragraph(s) of this summary, the casing is multiple casing parts.

According to an embodiment of any paragraph(s) of this summary, the multiple casing parts include an inner casing part and an outer casing part.

According to an embodiment of any paragraph(s) of this summary, the inner casing part and the outer casing part are threadedly coupled together.

According to an embodiment of any paragraph(s) of this summary, the casing includes a liner along at least part of an inside surface of the casing, with the liner at least in part defining the annular space.

According to an embodiment of any paragraph(s) of this summary, the fuel is configured within the annular space for end burning.

According to an embodiment of any paragraph(s) of this summary, the fuel is configured within the annular space for core burning.

According to an embodiment of any paragraph(s) of this summary, the fuel is configured within the annular space for both end burning and core burning.

According to an embodiment of any paragraph(s) of this summary, the fuel has one or more channels therein.

According to an embodiment of any paragraph(s) of this summary, the one or more channels include at least one channel in a longitudinal direction.

According to an embodiment of any paragraph(s) of this summary, the fuel is along an outer wall of the casing, with a space between the fuel and an inner wall of the casing.

According to an embodiment of any paragraph(s) of this summary, the booster rocket further includes an igniter in the casing.

According to an embodiment of any paragraph(s) of this summary, the booster rocket is in combination with an object to which the rocket booster is mechanically coupled.

According to an embodiment of any paragraph(s) of this summary, the object is a part of a flight vehicle.

According to an embodiment of any paragraph(s) of this summary, the object is an aft part of a flight vehicle.

According to an embodiment of any paragraph(s) of this summary, the object is part of a propulsion device at an aft end of the flight vehicle.

According to an embodiment of any paragraph(s) of this summary, the object is centered on a longitudinal centerline of the flight vehicle.

According to an embodiment of any paragraph(s) of this summary, the rocket booster is centered around a longitudinal centerline of the flight vehicle.

According to an embodiment of any paragraph(s) of this summary, the object is a turbojet engine.

According to an embodiment of any paragraph(s) of this summary, the object protrudes from an aft end of a fuselage of the flight vehicle.

According to an embodiment of any paragraph(s) of this summary, the flight vehicle is a missile.

According to another aspect of the invention, a missile includes: a fuselage; a main propulsion system that includes a nozzle protruding aftward from the fuselage; and a booster rocket around the nozzle. The booster rocket includes: an annular casing defining an annular space therewithin, and having a central opening through which the nozzle protrudes; a solid rocket fuel in the annular space; and one or more nozzle pieces mechanically coupled to the annular casing, defining one or more nozzles at an aft end of the annular casing.

According to yet another aspect of the invention, a method for increasing thrust of a flight vehicle includes the steps of: placing an annular booster rocket around a part of a main propulsion system of the flight vehicle; and burning fuel of the booster rocket to product thrust.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

A rocket booster has an annular shape, with a casing defining an annular space therewithin, and a solid rocket fuel in the annular spacing. The rocket booster also includes one or more nozzle pieces, mechanically coupled to the casing, that define one or more nozzles at the aft side of the rocket booster. The rocket booster may be mechanically coupled to an object protruding from the back of a fuselage of a flight vehicle, such as a missile. For example, the rocket booster may be placed around an aft turbojet nozzle of the flight vehicle. This allows the rocket booster to be used in situations where primary propulsion must be running both before and after (and perhaps during) the firing of the rocket booster. The rocket booster also advantageously may provide thrust along the centerline of the flight vehicle, and may be used in situations where there is a requirement to maintain the booster as part of the flight vehicle throughout flight. The rocket booster may have a truncated aerospike nozzle configuration, and may provide for a low-drag additional propulsion system that does not interfere with the operation of the primary propulsion system. Further, the casing of the rocket booster may double as a rear jet engine mount.

Figure 1:
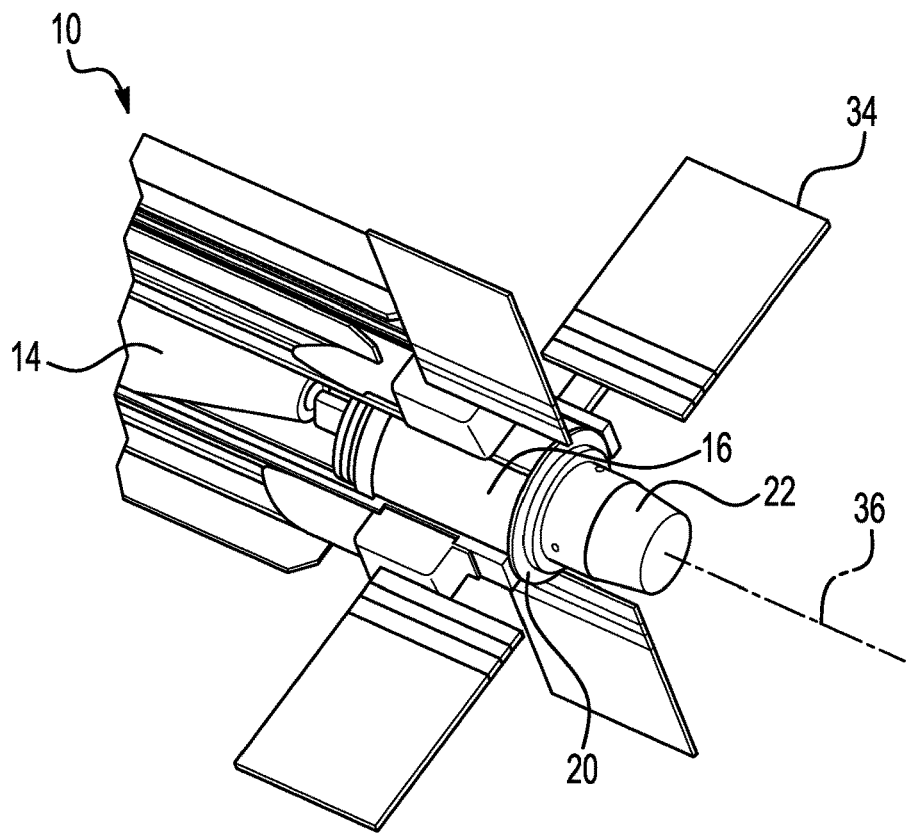
FIG. 1 is an oblique view of a portion of a flight vehicle, capable of receiving a booster rocket according to an embodiment of the present invention.
Figure 2:
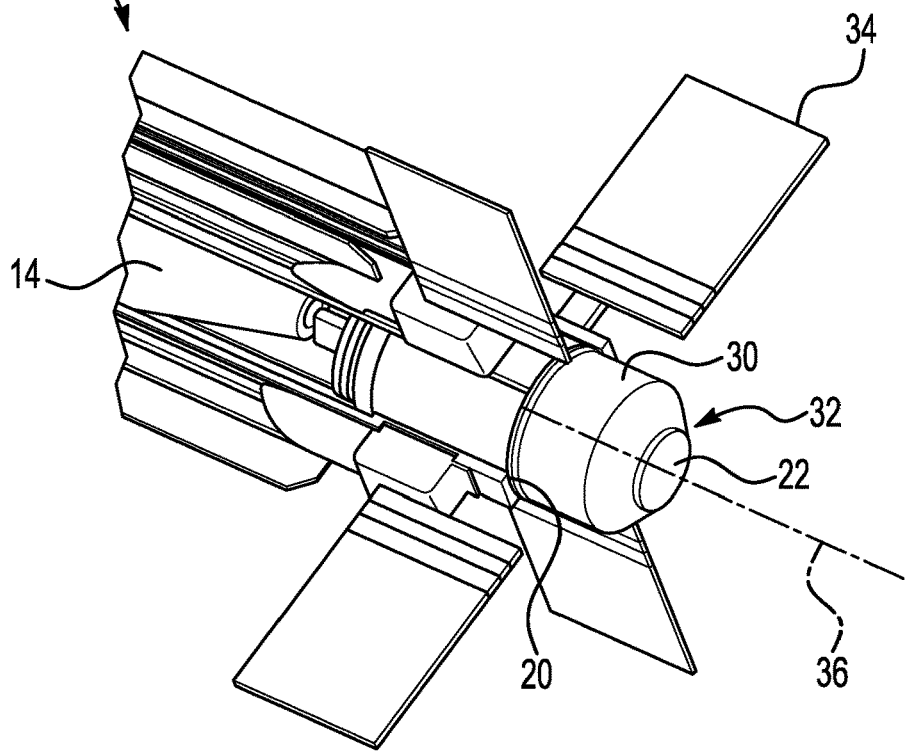
FIG. 2 is an oblique of the flight vehicle portion of FIG. 1, with the booster rocket installed.

With reference initially to FIGS. 1 and 2, a flight vehicle 10, such as a missile, includes a fuselage 14, with a main propulsion device 16 protruding from or as part of an aft end 20 of the fuselage 14. The main propulsion device 16 may be a turbojet engine. The protruding part of the main propulsion device 16 may be a nozzle 22 of the turbojet engine.

As shown in FIG. 2, a booster rocket 30 may be mounted on and around the nozzle 22, with the nozzle 22 protruding through a central opening 32 in the booster rocket 30. The booster rocket 30 may thereby provide additional thrust to the flight vehicle 10, without interfering with the operability of the main propulsion device 16. The booster rocket 30 may provide the additional thrust without affecting the general envelope of the flight vehicle 10.

The missile (flight vehicle) 10 may have additional features, for example fins 34 or other wings or control surfaces. Other types of additional features include a guidance system, a communications system, various types of sensors or information-gathering features, and a payload such as a warhead or other destructive material.

The booster rocket 30 is shown mounted around the nozzle 22, but it will be appreciated that the nozzle 22 is but one example of a broader category of objects to which the booster rocket 30 is mounted. The object may alternatively be other sorts of structures, whether provide a propulsive function or not, that pass into or through the central opening 32 of the booster rocket 30. Advantageously, both the object (the nozzle 22 in the illustrated embodiment) and the booster rocket 30 are centered around a longitudinal centerline (central axis) 36 of the flight vehicle 10.

As explained in greater detail below with regard to various embodiments, the booster rocket 30 has one or more one or more nozzle pieces, defining one or more nozzles for output of the pressurized gases from the booster 30. In one embodiment the one or more nozzle pieces includes a ring-shaped annular piece that defines (at least in part) an annular nozzle. In another embodiment the one or more nozzle pieces include multiple nozzle pieces that define multiple nozzles, for instance circumferentially spaced about the booster 30.

The flight vehicle 10 is just one example of the many types of flight vehicles that may receive the booster rocket 30, in order to produce additional thrust. Alternatives to the missile are other types of vehicles with main propulsion devices of any of a variety of suitable types.

Figure 3:
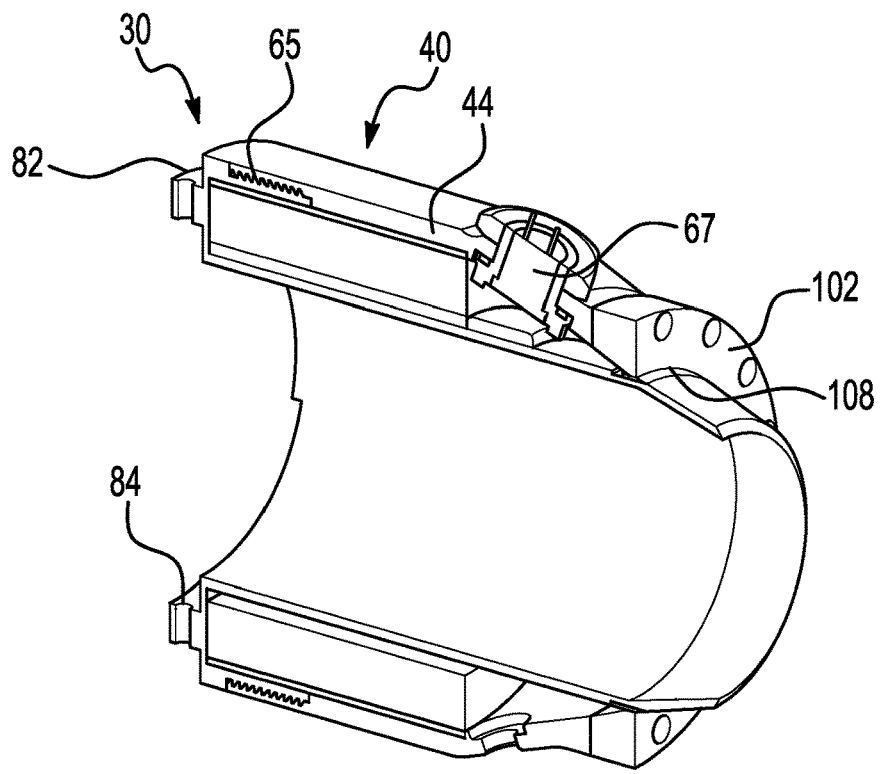
FIG. 3 is an oblique sectional view of the booster rocket of FIG. 2.
Figure 4:
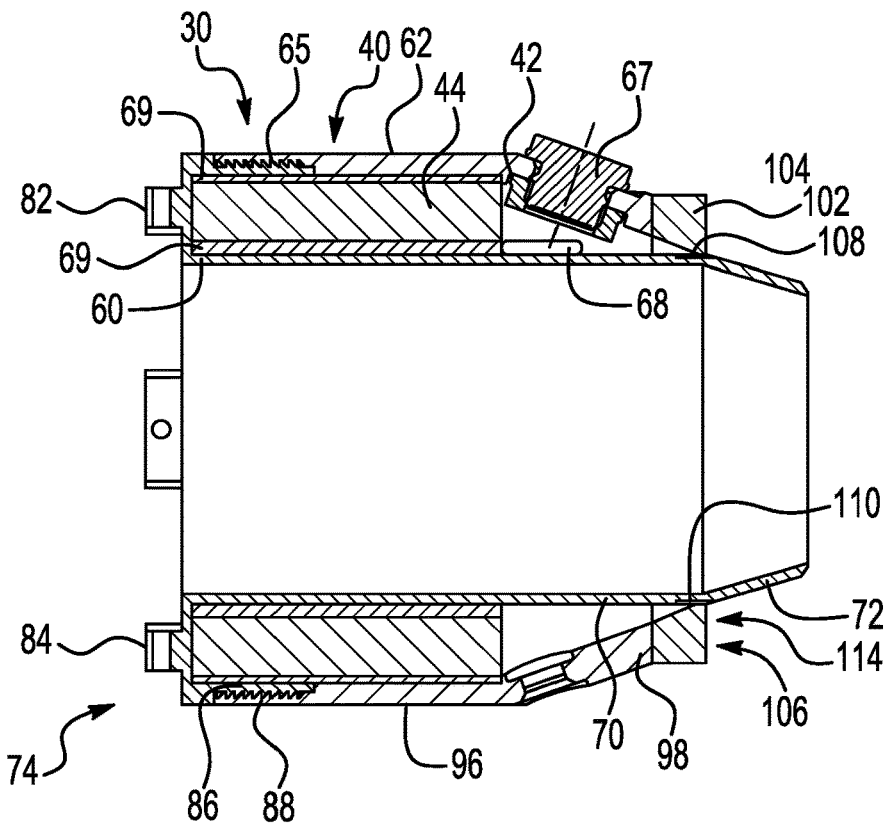
FIG. 4 is a side sectional view of the booster rocket of FIG. 2.

FIGS. 3 and 4 show further details of one embodiment of the booster rocket 30. The rocket 30 includes an annular casing 40 that defines an annular space 42 where a solid rocket fuel (propellant) 44 is located. Many configurations are possible for the fuel (propellant) 44. As described further below, the fuel 44 may optionally have one or more channels therein, of any of various suitable configurations, to control the burn rate. Such channels, when present, may include at least one channel in a longitudinal (axial) direction, parallel to an axis of the flight vehicle 10 (the centerline 36), which may be coincident with axes of both the booster rocket 30 and the object (such as the turbojet nozzle 22) to and around which the booster rocket 30 is mounted. The fuel 44 is located between the inner part 60 and the outer part 62. Combustion of the fuel 44 occurs in the annular space 42, which acts as a combustion chamber for the booster rocket 30.

The casing 40 is formed out of two separate pieces or parts 60 and 62, which are threadedly joined together. The parts 60 and 62 are formed separately and screwed together along threads 65, after an annular solid fuel (propellant) 44 is put into place. The threaded connection may be sealed, as with a silicone sealant, to prevent egress of hot gasses. Once the parts 60 and 62 are joined together the fuel 44 is in an annular space 42 defined by the parts 60 and 62. The fuel 44 can be ignited by an igniter 67 that is secured in a hole in the outer casing part 62. An ignition booster 68 may be placed on the inner casing part 60, to work in combination with the igniter 67 to facilitate ignition of the fuel 44. The ignition booster 68 may be any of a variety of easily ignitable/combustible materials.

The casing parts 60 and 62 may have a liner 69 on their surfaces that define the annular space 42 that acts as the combustion chamber. The liner 69 may be a heat-resistant material that provides some protection to the casing parts 60 and 62. The liner 69 may be made of any of a variety of suitable materials, non-limiting examples being aluminum and cardboard.

The inner casing part 60 has a cylindrical forward section 70 and an inwardly-angled aft section 72. The inner casing part sections 70 and 72 may correspond in exterior shape to an object to which the rocket booster 30, for example to the shape of a turbojet nozzle. Further, the inwardly-angled aft section 72 may constitute a truncated aerospike shape, which may provide for efficiency in the operation of the booster rocket 30. The inner casing part 60 includes a forward end 74 which constitutes the forward end of the rocket booster 30. The forward end 74 may have mechanical connections 82 and 84 thereupon, which may be configured to connect the booster rocket 30 to a flight vehicle. The mechanical connections 82 and 84 may be any of a variety of suitable clips, clamps, or other suitable mechanisms for making a connection. The inner casing part 60 also includes an externally threaded outer portion 86 that is used to make the threaded connection with an internally threaded cylindrical aft section 88 of the outer casing part 62.

The outer casing part 62 includes a cylindrical forward section 96, and an inwardly-sloped aft section 98 that is bent inward toward the turbojet nozzle 22. In some embodiments the slope of the aft section 98 may correspond to a slope of the turbojet nozzle 22. The igniter 67 may be located in the sloped aft section 98, and the ignition booster 68 may be located on an outer surface of the cylindrical section 70 of the inner casing part 60.

In the illustrated embodiment the booster rocket 30 includes a ring-shaped annular nozzle piece 102. The nozzle piece 102 is mechanically coupled or attached to the aft end of the annular casing 40, more specifically to the aft side of the sloped aft section 98 of the outer casing part 62. The nozzle piece 102 may be bolted to the aft section 98. A seal 104, such as a silicone seal, may be provided between the nozzle piece 102 and the aft section 98.

The annular nozzle piece 102 may be part of a throat insert set 106 that also includes an inner nozzle insert 108. The inner nozzle insert 108 has an annular shape, a band that fits around the inner casing part 60. The inner nozzle insert 108 is attached to an other surface of the inner casing part 60. For example, the inner nozzle insert 108 may be located in a slot 110 at or close to the intersection of the cylindrical forward section 70 and the inwardly-angled aft section 72. The inner nozzle insert 108 may be bonded and attached by shear bolts to the inner casing part 60.

The annular nozzle piece 102 and the inner nozzle insert 108 together define an annular nozzle 114 through which pressurized gases from the combustion of the fuel 44 exit the booster rocket 30 at its aft end. In the illustrated embodiment the annular nozzle 114 is an annular gap between the outer casing part 52 and an outer surface of the turbojet nozzle 22 that serves as the object around which the rocket booster 30 is installed.

The annular nozzle piece 102 and the inner nozzle insert 108 may be made of any of a variety of suitable materials. The piece 102 and/or the insert 108 may be made of a metallic or nonmetallic material. For example, they may be made of the same material as the casing parts 60 and 62, for example being made of aluminum. Alternatively the annular nozzle piece 102 and/or the inner nozzle insert 108 may be made of a phenolic material or other suitable non-metallic material.

The use of the nozzle piece 102 and the nozzle insert 108 to define the annular nozzle 114 may facilitate better performance of the booster rocket 30. The use of the throat insert set 106 may provide for better tolerances in the annular gap of the annular nozzle 114, may provide for more better performance during the operation of the booster rocket 30, and/or may provide the opportunity to switch out different insert sets providing better and/or different performance characteristics.

Figure 5:
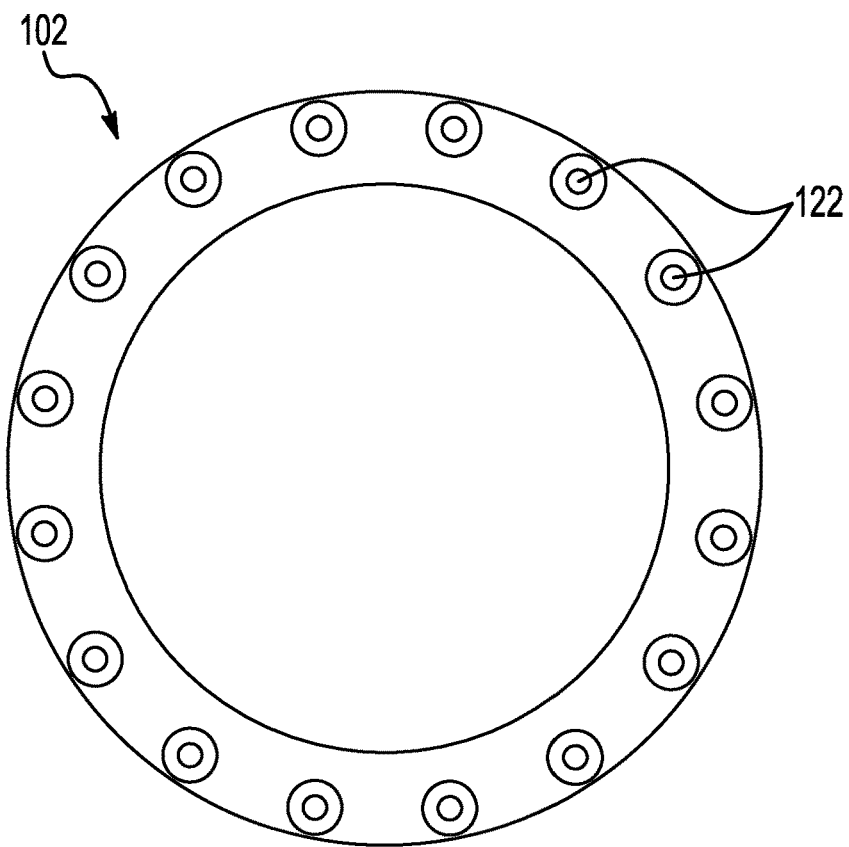
FIG. 5 is a plan view of an annular nozzle piece of the booster rocket of FIG. 2.
Figure 6:
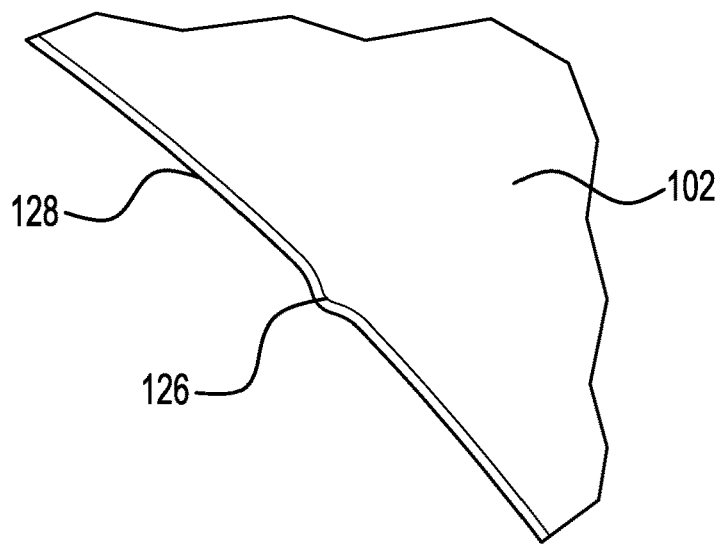
FIG. 6 is a detailed view of a portion of the nozzle piece of FIG. 5, showing protrusions of the nozzle piece, used to maintain an annular gap.

With reference now in addition to FIGS. 5 and 6, further details of the annular nozzle piece 102 are shown. The annular piece 102 has a series of holes 122 which may be used for bolts or other fasteners to couple the annular piece 102 to the aft section 98 (FIG. 3). Further, as best shown in FIG. 6, the annular piece 102 may have a series of protrusions 126 along its inner edge 128. The protrusions 126 may help maintain a desired configuration of the annular gap that serves as the annular nozzle 114, for example maintaining concentricity. The protrusions 126 protrude inward to maintain a desired spacing between the edge 128 and the inner nozzle insert 108 (FIG. 3). The protrusions 126 may be evenly circumferentially spaced around the edge 128. The protrusions may have a height of about 0.25 mm (0.01 inch), as a non-limiting example.

Many variations are possible in the configuration of a booster rocket that is capable of being installed around an object. Some alternative configurations are described below, and different sorts of manufacturing techniques may be used to produce the booster rocket 30, and alternative booster rocket configurations.

The booster rocket 30 may have additional features not shown in the figures, for example having an igniter placed in an opening in the casing 40 at a suitable location for igniting the fuel (propellant) 44. Such additional features may be shown in one or more of the other embodiments shown below.

The booster rocket 30 provides a low profile, without impacting the envelope of the flight vehicle 10 (FIG. 1). The low profile means that the rocket booster 30 does not significantly impact the drag of the flight vehicle 10. The rocket 30 is retained without the flight vehicle 10 after use, and does not prevent use of the main propulsion device 16 (FIG. 1), before, after, or during firing of the booster rocket 30. The rocket 30 may be configured to operate with a truncated aerospace nozzle configuration, which is compact and altitude compensating.

Figure 7:
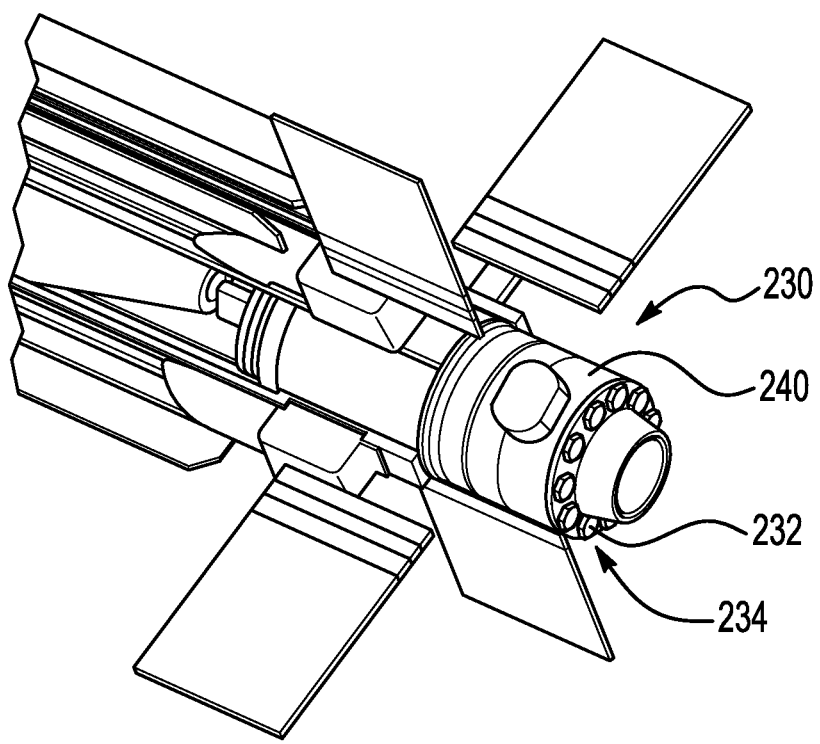
FIG. 7 is an oblique view of a booster rocket, according to another embodiment of the invention.
Figure 8:
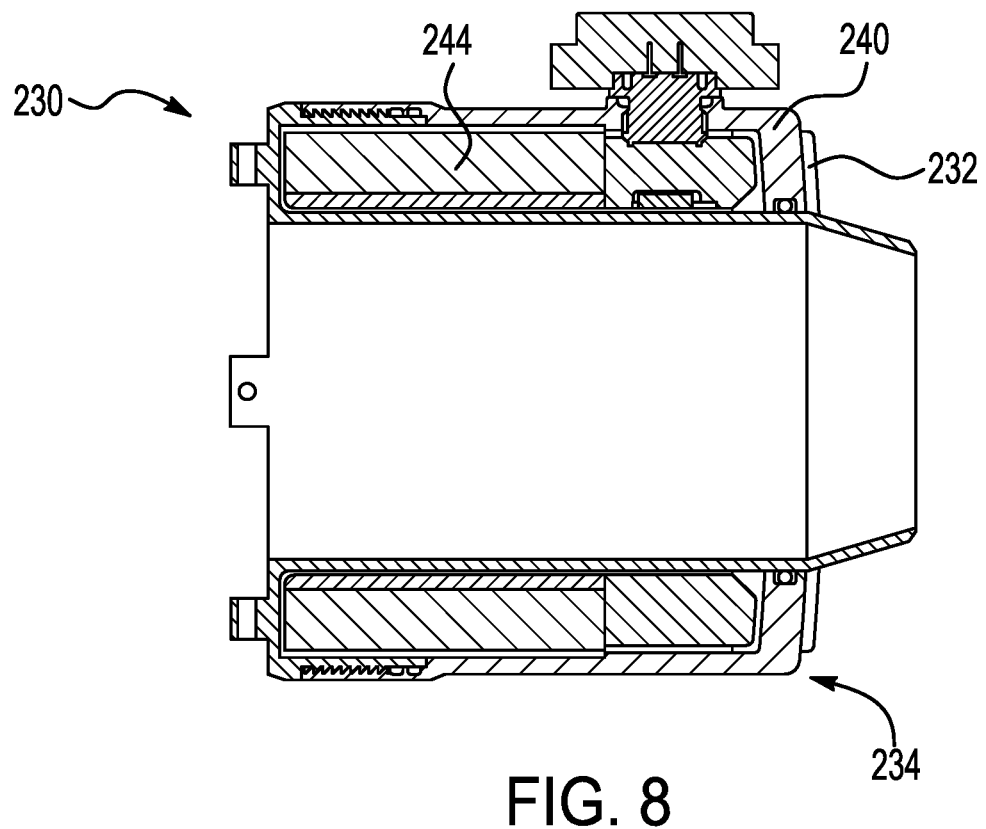
FIG. 8 is a side sectional view of the booster rocket of FIG. 7.

FIGS. 7 and 8 shows another embodiment, a rocket booster 230 that includes multiple nozzle pieces 232 circumferentially spaced (for example evenly circumferentially spaced) in a series of circular openings 234 on an aft surface of an annular casing 240 of the rocket booster 230. The nozzle pieces 232 define respective nozzles through which pressurized gasses pass from the interior of the annular casing 240, in which annular fuel 244 burns. In other circumstances, the rocket booster 230 may be similar to the other rocket boosters (and variations) described elsewhere herewithin.

Figure 9:
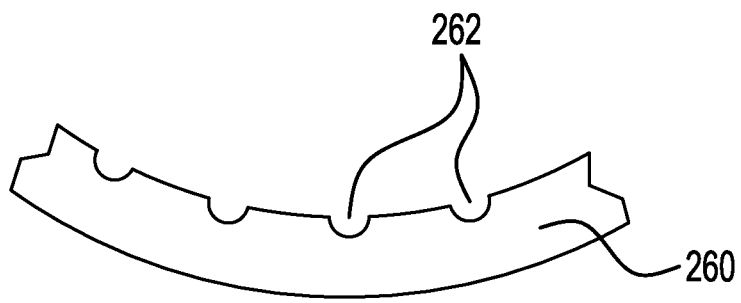
FIG. 9 is a schematic cross-sectional view of a portion of a channeled annular fuel usable with booster rockets in embodiments of the invention.

FIG. 9 shows a cross-sectional shape of an annular fuel 260 that includes a series of longitudinal channels 262 to regulate the burn speed and thus the thrust production. Such channels may have any of a variety of suitable configurations (depths and/or shapes, for example), and there may be various numbers of channels, with any of various suitable spacings, to produce a desire thrust profile over time. It should be appreciated that the configuration shown in FIG. 7 is for illustration purposes, and the channels 262 shown are not necessarily to scale.

Figure 10:
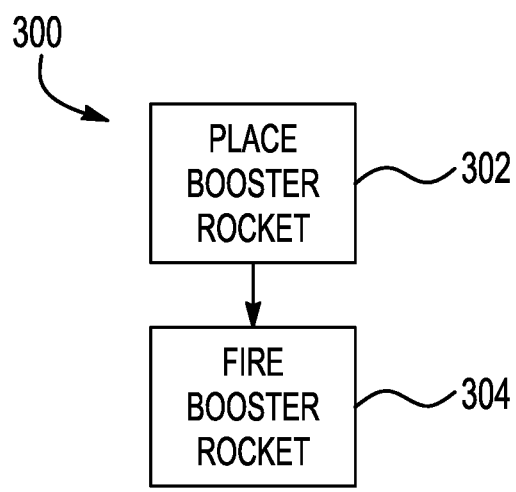
FIG. 10 is a high-level flow chart of a method of increasing thrust of a flight vehicle, according to an embodiment of the invention.

FIG. 10 shows a method 300 of use of a booster rocket, such as the booster rocket 30 (FIG. 3) or the booster rocket 230 (FIG. 7). In step 302 the booster rocket is placed around a part of a flight vehicle, such as a nozzle of a main propulsion system, which may be a turbojet. In step 304 propellant (fuel) of the booster rocket is burned used to provide additional thrust to the flight vehicle, before, after, or during operation of the main propulsion system. The booster rocket remains connected to the flight vehicle even after operation.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A booster rocket comprising:
    an annular casing defining an annular space therewithin, and having a central opening, wherein the annular casing includes an inner part and an outer part, wherein the inner part includes an annular slot extending along an outer surface of the inner part;
    a solid rocket fuel in the annular space; and
    one or more nozzle pieces mechanically coupled to the annular casing, defining one or more nozzles at an aft end of the annular casing;
    wherein the one or more nozzle pieces includes an annular nozzle piece that defines an annular nozzle between the annular nozzle piece and the annular slot;
    wherein the booster rocket is a capable of being placed around and installed around a separate object;
    wherein the annular nozzle piece has an inwardly sloped section that directs flow inwardly as the flow approaches the annular nozzle; and
    wherein the annular casing includes an inwardly-angled aft section aft of the annular nozzle.

2. The booster rocket of claim 1, further comprising a seal between the annular nozzle piece and the annular casing.

3. The booster rocket of claim 1, wherein the annular nozzle piece defines the annular nozzle in combination with an inner nozzle insert that is attached to the annular slot in the annular casing.

4. The booster rocket of claim 3, wherein the annular nozzle piece and the inner nozzle insert together constitute a throat insert set.

5. The booster rocket of claim 1, wherein the annular nozzle piece has protrusions protruding inward from an inner edge at the aft end of the one or more annular nozzle pieces, the protrusions facilitating maintaining an annular gap of the annular nozzle.

6. The booster rocket of claim 1, wherein the annular nozzle piece is made of a metallic material.

7. The booster rocket of claim 1, wherein the annular nozzle piece is made of a non-metallic material.

8. The booster rocket of claim 1, wherein the annular nozzle piece is made of a phenolic material.

9. The booster rocket of claim 1, further comprising an igniter coupled to an outer surface of the annular casing, with the igniter operatively coupled to the solid rocket fuel, to facilitate initiation of combustion of the solid rocket fuel.

10. The booster rocket of claim 9, further comprising an ignition booster on an inner wall of the annular casing, with the ignition booster operatively coupled to the igniter and the solid rocket fuel, to facilitate initiation of combustion of the solid rocket fuel.

11. The booster rocket of claim 1, wherein the annular casing includes multiple casing parts.

12. The booster rocket of claim 11,
wherein the multiple casing parts include an inner casing part and an outer casing part; and
wherein the inner casing part and the outer casing part are threadedly coupled together.

13. The booster rocket of claim 1, in combination with the separate object to which the rocket booster is mechanically coupled.

14. The combination of claim 13, wherein the separate object is an aft part of a flight vehicle.

15. The combination of claim 14, wherein the separate object is part of a propulsion device at an aft end of the flight vehicle.

16. The combination of claim 14, wherein the flight vehicle is a missile.

17. The booster rocket of claim 1,
in combination with the separate object;
wherein the separate object is part of a propulsion device at an aft end of the flight vehicle; and
wherein an inner surface of the annular casing is in contact with an outer surface of the separate object, but is not fixedly attached to the outer surface of the separate object.

18. A booster rocket comprising:
an annular casing defining an annular space therewithin, and having a central opening, wherein the annular casing includes an inner part and an outer part, wherein the inner part includes an annular slot extending along an outer surface of the inner part;
a solid rocket fuel in the annular space; and
one or more nozzle pieces mechanically coupled to the annular casing, defining one or more nozzles between the one or more nozzle pieces and the annular slot at an aft end of the annular casing;
wherein the one or more nozzle pieces includes multiple nozzle pieces;
wherein the multiple nozzle pieces are circumferentially spaced around an aft end of the annular casing; and
wherein the nozzle pieces extend aft of an aft surface of the annular casing.

19. The booster rocket of claim 18, wherein the booster rocket is a capable of being placed around and installed around a separate object.

20. A missile comprising:
a fuselage;
a main propulsion system that includes a nozzle protruding aftward from the fuselage; and
a booster rocket around the nozzle, the booster rocket including:
an annular casing defining an annular space therewithin, and having a central opening through which the nozzle protrudes, wherein the annular casing includes an inner part and an outer part, wherein the inner part includes an annular slot extending along an outer surface of the inner part;
a solid rocket fuel in the annular space; and
one or more nozzle pieces mechanically coupled to the annular casing, defining one or more nozzles at an aft end of the annular casing;
wherein the one or more nozzle pieces includes an annular nozzle piece that defines an annular nozzle between the annular nozzle piece and the annular slot;
wherein the annular nozzle piece has an inwardly sloped section that directs flow inwardly as the flow approaches the annular nozzle;
wherein the annular casing includes an inwardly-angled aft section aft of the annular nozzle; and
wherein the booster rocket is a capable of being placed around and installed around a separate object.

* * * * *